(12) United States Patent
Werner et al.

(10) Patent No.: US 8,046,879 B2
(45) Date of Patent: Nov. 1, 2011

(54) FASTENER

(75) Inventors: Wolfgang Werner, Reutlingen (DE);
Mario Stigler, Schöffengrund (DE);
Michael Schneider, Lahnau (DE);
Johann-Adalbert Reindl, Biebertal
(DE); Thomas Schmidt, Haverlah (DE)

(73) Assignee: Newfrey LLC, Newark, DE (US)

( * ) Notice: Subject to any disclaimer, the term of this patent is extended or adjusted under 35 U.S.C. 154(b) by 318 days.

(21) Appl. No.: 12/352,960

(22) Filed: Jan. 13, 2009

(65) Prior Publication Data

US 2009/0133228 A1 May 28, 2009

Related U.S. Application Data

(63) Continuation of application No. PCT/EP2007/056729, filed on Jul. 4, 2007.

(30) Foreign Application Priority Data

Jul. 13, 2006 (DE) .......................... 10 2006 032 641

(51) Int. Cl.
*F16B 5/06* (2006.01)
*F16B 19/00* (2006.01)
*F16B 21/00* (2006.01)

(52) U.S. Cl. ............. 24/297; 24/292; 411/182; 411/508

(58) Field of Classification Search ............ 24/289–295, 24/297, 458; 411/171, 182, 508, 913
See application file for complete search history.

(56) References Cited

U.S. PATENT DOCUMENTS

| | | | | |
|---|---|---|---|---|
| 3,701,302 A | * | 10/1972 | Pestka et al. ............... | 411/913 |
| 3,991,446 A | * | 11/1976 | Mooney et al. ............. | 411/508 |
| 4,927,306 A | * | 5/1990 | Sato ............................ | 411/182 |
| 5,129,768 A | * | 7/1992 | Hoyle et al. ................. | 411/182 |
| 5,290,137 A | * | 3/1994 | Duffy, Jr. .................... | 411/508 |
| 5,291,639 A | | 3/1994 | Baum et al. | |
| 5,795,118 A | | 8/1998 | Osada et al. | |
| 6,205,625 B1 | | 3/2001 | Kato | |
| 6,560,819 B2 | * | 5/2003 | Mizuno et al. .............. | 411/182 |
| 7,188,393 B2 | * | 3/2007 | Kawai .......................... | 24/297 |

FOREIGN PATENT DOCUMENTS

| | | |
|---|---|---|
| DE | 19929924 A1 | 1/2000 |
| DE | 102004031342 A1 | 1/2006 |
| EP | 0566296 A1 | 10/1993 |
| GB | 2307508 A | 5/1997 |

OTHER PUBLICATIONS

PCT/EP2007/056729 International Search Report.

* cited by examiner

*Primary Examiner* — Robert Sandy
(74) *Attorney, Agent, or Firm* — Michael P. Leary

(57) ABSTRACT

A fastener with a shank and, arranged at one end of the shank, a head intended for welding to a workpiece, has multiple detent pawls formed on the shank that extend radially outward from the shank toward the head and that are elastically resilient in the radially inward direction. On the outside, each detent pawl has an engagement recess with support surfaces. The shank has a longitudinal hole, in which is located a stud, wherein one end of the stud projects out of the longitudinal hole and forms the head for welding. Also formed on the shank is a flange that is elastically resilient in the axial direction, whose outermost edge region is located opposite the engagement recess of the detent pawls.

19 Claims, 4 Drawing Sheets

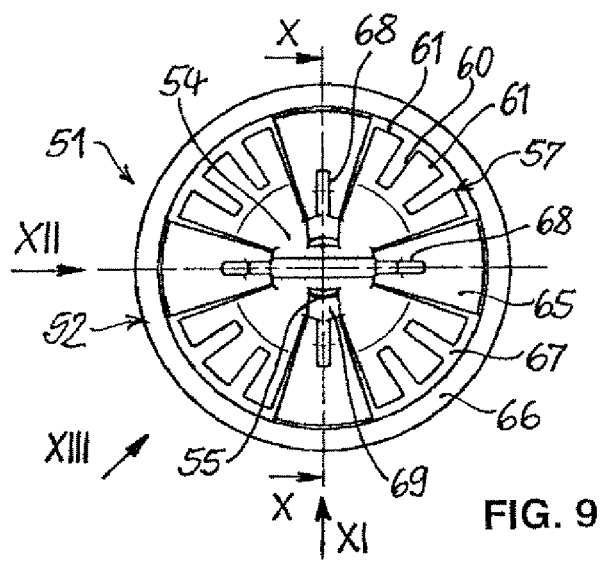
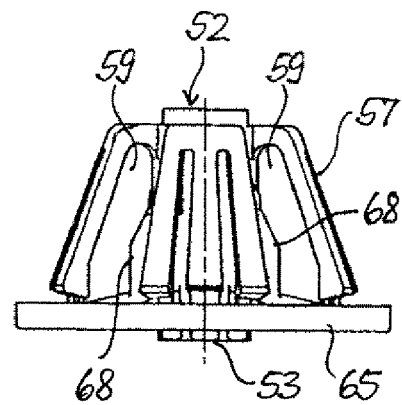
FIG. 9    FIG. 10
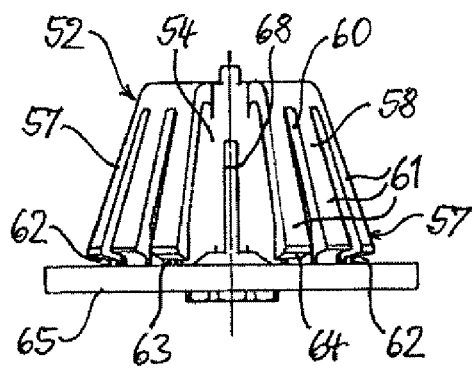
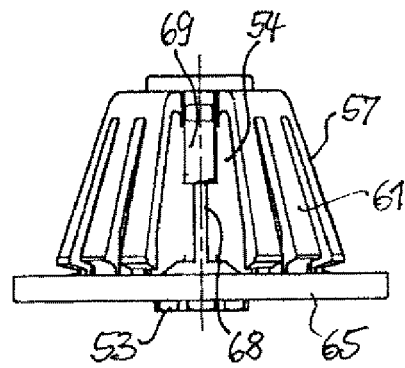
FIG. 11    FIG. 12
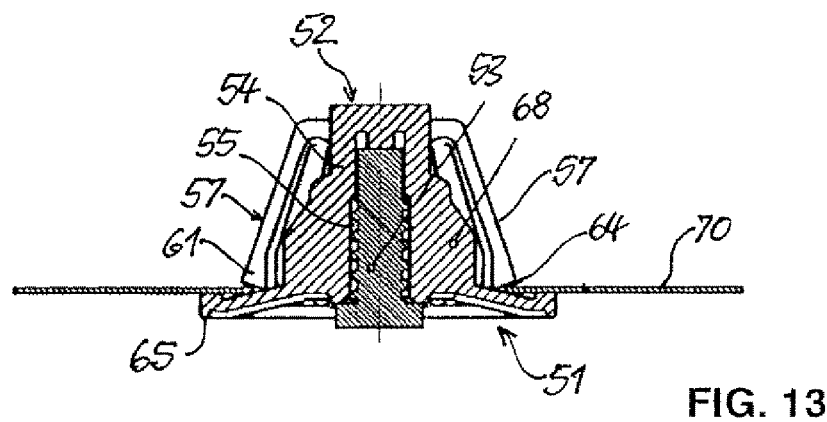
FIG. 13

FASTENER

CROSS-REFERENCE TO RELATED APPLICATIONS

The present application is a continuation of PCT Application No. PCT/EP2007/056729, filed Jul. 4, 2007 which claims priority from German Application No. 10 2006 032 641.5, filed Jul. 13, 2006, the disclosures of which are incorporated herein by reference.

BACKGROUND OF THE INVENTION

The invention relates to a fastener with a shank, with a head at one end of the shank intended for welding to a workpiece, and with at least one detent pawl formed on the shank that extends radially outward from the shank toward the head and that is elastically resilient in the radially inward direction, wherein the shank has a longitudinal hole in which is located a stud, and wherein one end of the stud projects out of the longitudinal hole and forms the head.

Fasteners of the specified type may be used in automotive manufacture, among other applications, for example in order to attach trim panels to the floor, walls, doors or roof of a motor vehicle body. The fasteners are meant to attach the trim panels tightly and durably to the relevant body part while additionally permitting the easiest and most economical installation possible of the paneling.

A fastener of the aforementioned type is known from DE 10 2004 031 342 A1. It has a sleeve-like outer part and an inner part which can be inserted therein, both of which parts are made of plastic, wherein the inner part has a longitudinal hole into which is screwed a stud that has an external thread, and the head of said stud forms a weldable end. The prior art fastener consists of three separate parts and consequently is relatively expensive to manufacture and install. Moreover, it has a relatively great axial length, which limits the possibilities for its application.

Known from DE 19,929,924 A1 is a single-piece fastener that can be made of plastic and has a leg section with a foot that is designed to be welded to a workpiece, and that has two elastic engagement claw sections arranged on opposite sides of the leg section extending diagonally outward from the end of the leg section to the foot section and are capable of being bent radially inward, wherein the engagement claw sections each have an engagement step designed as an inward recess. This fastener is only suitable for welding to plastic parts. It also has the disadvantage that the axial free clamping length is dependent on the formation of the weld joint, so attachment without play is only possible when the trim panel to be attached has sufficient elasticity.

One aspect of the invention is to create a fastener of the aforementioned type which is easy and economical to manufacture, and permits easy installation. In addition, another aspect of the feature is retention of the components to be fastened may be free of play in the axial direction and is independent of the formation of the weld joint.

According to an aspect of the invention, the fastener comprises a shank, a head at one end of the shank that is intended for welding to a workpiece, and at least one detent pawl formed on the shank that extends radially outward from the shank toward the head and that is elastically resilient in the radially inward direction and that has on its outside an engagement recess with a radial and an axial support surface, wherein the shank has a longitudinal hole in which is located a stud, wherein one end of the stud projects out of the longitudinal hole and forms the head, and wherein a flange that is elastically resilient in the axial direction, whose outermost edge region is located opposite the engagement recess of the detent pawl, is formed on the shank.

Depending on the material of the workpiece that the fastener is to be welded to, a stud made of a suitable material, such as steel, aluminum, or plastic, may be inserted in the shank. The shank, detent pawl and flange of the fastener may be made of a thermoplastic material.

Moreover, another aspect of the fastener is to make it possible to fasten a component, for example a trim panel of a motor vehicle, in a manner that is vibration-proof and free of play, since said panel can be clamped in place between the resilient flange and the support surfaces of the detent pawl independent of the formation of the weld joint. All that is necessary to install a component to be fastened is to place the component's fastening opening on the welded-on fastener and to press on it until it latches into the engagement recess of the detent pawl. After the latching, the trim panel is held without play by the elastically resilient flange in the axial direction and by the elastic detent pawl in the radial direction relative to the shank. The design of the engagement recess ensures here that the detent pawl engages in the opening of the trim panel and braces itself outward in the radial direction in the trim panel opening.

In one embodiment, the fastener according to the invention has three detent pawls, which are formed on the shank and are separated from one another by gaps, wherein the outside surfaces of the detent pawls constitute segments of a common truncated cone surface and wherein the radial support surfaces of the detent pawl engagement recesses lie on a common cylindrical surface that is coaxial to the surface of the truncated cone. During installation, this design facilitates positioning of a component to be fastened having a circular fastening opening, while also ensuring precisely positioned attachment of the component by the fastener.

Easy manufacture of the fastener is made possible according to another proposal of the invention in that the flange is recessed in the area of the axial projection of the detent pawls. This measure makes it possible to mold the unit consisting of shank, detent pawls, and flange as a single piece using a two-part, and thus simple, mold tool.

In the case of a metallic stud, welding on of the fastener may be accomplished by means of an electric welder using the drawn arc method. It is necessary here to bring the stud into contact with a conductor to deliver the welding current. For this purpose, the head of the stud can have, between its weldable end and the shank, a contact section for placement of welding tongs. If the desired axial length of the head is too small to form a contact section, provision can be made according to another aspect of the invention for openings to be formed in the radial direction in the wall of the shank that are freely accessible from outside, and that open onto the longitudinal hole. Welding tongs or a contact element can be brought into contact with the stud through these openings.

If the stud is provided with an external thread and is screwed into the longitudinal hole of the shank, a tool engagement region for placement of a screwdriver or wrench can be provided on the end of the shank opposite the head. By this means, the attachment of a component can be released in a simple manner by unscrewing from the stud the unit consisting of the shank, detent pawls and flange.

Another possibility for detaching a retained component from the fastener consists in using a suitable tool, for example a tube, to bend the detent pawls far enough inward that they release from the retained component.

In welding devices for welding similar components, it has proven useful to feed these components to the welding device either singly or in groups through a plastic tube by means of compressed air. In this connection, plastic tubes with a round cross-section as well as profile tubes are used. In the latter, the inside tube profile corresponds to the envelope profile that the component to be conveyed has when it is in a suitable feed position. However, the use of a profile tube results in limitations on the mobility of the welding device on account of the high stiffness of such a tube, so feeding through a round tube may be advantageous. The fastener according to the invention is not suitable "as is" for feeding through a round tube, however, since it does not have appropriate guide surfaces to guide and stabilize the fastener in a suitable feed position with the longitudinal axis oriented in the feed direction. In order to nevertheless make feeding through a round tube possible, according to another proposal of the invention coupling elements are provided at the end of the shank opposite the head that are suitable for gripping the head of a second fastener. If multiple fasteners of this type are arranged coaxially and in the same orientation one after the other, then they make up a chain composed of multiple fasteners supported by the coupling elements, and this chain can be conveyed through a round tube without any problem, with the fasteners being guided by the edge of their flanges.

If it is also desirable for fasteners according to the invention to be singly conveyable through a round tube, this can be accomplished according to another proposal by guide elements that axially extend the outside contour of the flange and that have an axial length sufficiently long that the fastener can be conveyed with its longitudinal axis coaxial to the tube axis through a conveyor tube with a round cross-section in a positionally stable manner and without a tendency to jam. The guide elements are connected in a separable manner to the fastener by means of predetermined breaking points. In an advantageous embodiment, the guide elements can consist of multiple axially parallel rods arranged on the circumferential edge of the flange. Another suitable embodiment provides for the guide elements to consist of plates which are arranged radially on the detent pawls or shank and which have axially parallel outer guide edges. In place of, or in addition to, the guide elements, a guide disk of the same diameter as the flange may be arranged a suitable distance from, and parallel to, the flange, being attached to the shank or guide elements in a separable manner by means of predetermined breaking points.

BRIEF DESCRIPTION OF THE DRAWINGS

The invention is described in detail below using exemplary embodiments represented in the drawings. Shown are:

FIG. 9 a view of a face of another exemplary embodiment of inventive fastener,

FIG. 10 a cross-section X-X of the fastener from FIG. 9,

FIG. 11 a view XI of the fastener from FIG. 9,

FIG. 12 a view XII of the fastener from FIG. 9,

FIG. 13 a view XIII of the fastener from FIG. 9.

DETAILED DESCRIPTION OF EXEMPLARY EMBODIMENTS OF THE INVENTION

Figure 1:
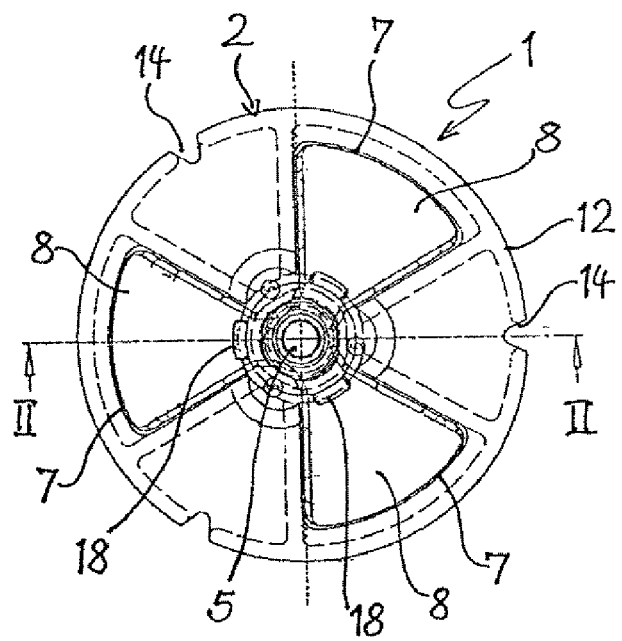
FIG. 1 a view of a first face of an exemplary embodiment of inventive fastener.
Figure 2:
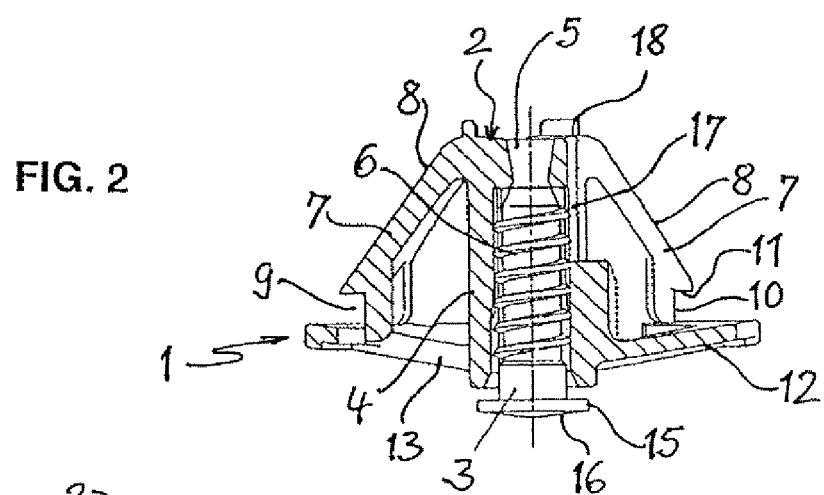
FIG. 2 a cross-section II-II of the fastener from FIG. 1.
Figure 3:
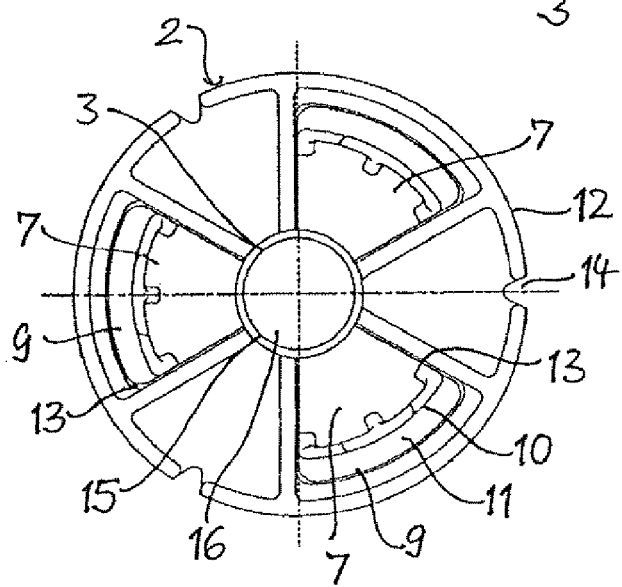
FIG. 3 a view of the second face of the fastener from FIG. 1.

The fastener 1 shown in FIGS. 1 through 3 consists of a clip 2 which can be produced in the injection molding process from a thermoplastic material, and a stud 3 inserted therein which can be made of metal, for example steel or aluminum, but also of plastic.

The clip 2 has a straight shank 4 with a central longitudinal hole 5, which serves to accommodate the stud 3. Formed in the longitudinal hole 5 are longitudinal ribs, which serve to anchor the threaded section 6—which has an external thread—of the stud 3. Molded onto one end of the shank 4 are three detent pawls 7, which extend radially outward and toward the other end of the shank 4. The detent pawls 7 are equidistant from one another and each extends over a sector of 60° with respect to the axis of the longitudinal hole 5. On the outside, the detent pawls 7 have outside surfaces 8, which constitute segments of a common truncated cone surface that is coaxial to the longitudinal axis. The cone angle of the truncated cone surface may be in a range from 60° to 90°. At their free ends, the detent pawls 7 are provided with engagement recesses 9, which have cylindrical support surfaces 10 coaxial to the longitudinal axis and which also have flat support surfaces 11. The support surfaces 11 lie in a common radial plane.

Molded onto the end of the shank 4 opposite the connection points of the detent pawls 7 is a flange 12 that extends radially outward The flange 12 has the shape of a shallow truncated cone with a cone angle of approximately 160° and a circular edge whose outer diameter is greater than the largest radial extent of the detent pawls 7. In the area of the axial projection of the detent pawls 7, the flange 12 has recesses 13, whose purpose is the passage of sections of the mold tool and which are intended to mold the interior sides of the detent pawls 7 and the outsides of the shank 4 opposite thereto. The recesses 13 also are responsible for greater elastic resilience of the flange 12 as compared to a closed flange. In the non-recessed areas, notches 14 are provided at a spacing of 120° in the circumferential edge of the flange 12. With the aid of the notches 14, the fastener 1 can be precisely positioned during conveying or processing.

The stud 3 arranged in the longitudinal hole 5 projects out of the longitudinal hole 5 on the flange-side end of the shank 4, where it forms a head 15 with a shallowly conical weldable surface 16. The diameter of the head 15 is greater than the diameter of the stud 3. Provided in the shank 4 in the gaps between the detent pawls 7 are openings 17, which open onto the longitudinal hole 5. By means of the openings 17, the stud 3 can be gripped by a welding device and brought into contact with an element conducting the welding current. Therefore, no additional clearance is required at the head 15, or between the head and the shank 4, in order to grip and contact the stud 3 in the welding device.

Arranged at the end of the shank 4 opposite the head 15 are axially projecting coupling elements 18, which serve to hold and center the head of a second, identical fastener. With the aid of these coupling elements 18, multiple fasteners lined up one behind the other can be connected to one another such that they are oriented coaxial to one another, and can be conveyed together without affecting their orientation. The coupling elements 18 can either be designed such that the head 15 of the next element is only loosely held between the coupling elements 18, or the coupling elements 18 may be designed such that they clamp the inserted head 15 of the next fastener in place so that a sufficiently stable connection between the individual elements is achieved for feeding the fasteners in a channel or tube with a round cross-section.

Figure 4:
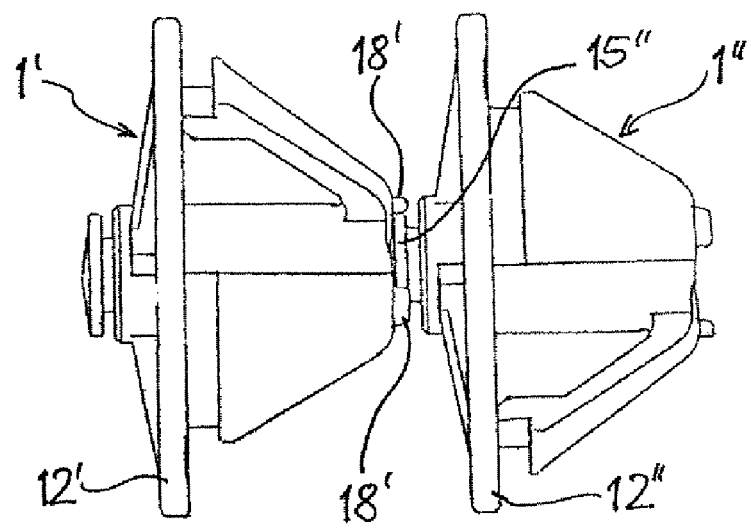
FIG. 4 a side view of two fasteners from FIG. 1 coupled together for feeding.

FIG. 4 illustrates such a connection of two fasteners 1' and 1" arranged in a row one behind the other, which are held together by clamping of the head 15" between the coupling elements 18'. Such an arrangement of two or more fasteners can be fed in the axial direction through a conveying channel, for example a tube with a circular cross-section, wherein the flanges 12', 12" guide the fasteners along the tube wall in a non-jamming way. During feeding of the welding device, the fasteners 1', 1" are separated from one another by overcoming the clamping force connecting them.

Figure 5:
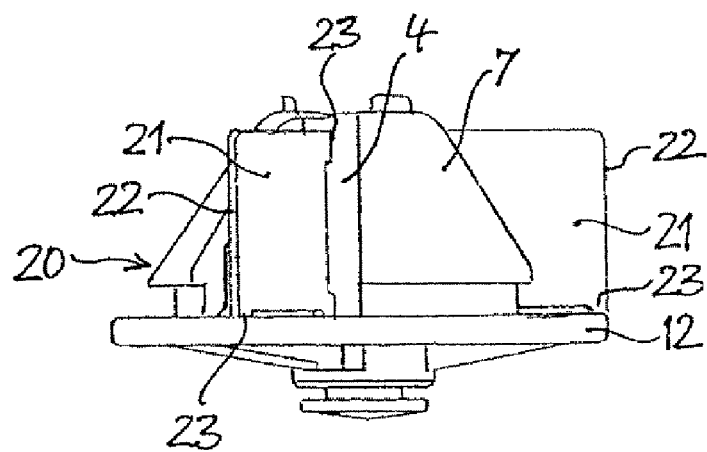
FIG. 5 a fastener with platelike guide elements.

FIG. 5 shows a variant embodiment of a fastener 20, which is designed to be fed singly through a round tube or pipe. The fastener 20 differs from the above-described fastener 1 in that guide elements in the form of plates 21 are formed in the gaps between the detent pawls 7, and these guide elements serve to guide the fastener 20 in a cylindrical tube, pipe or channel. The plates 21 extend in the radial direction and have an outside edge 22 which is parallel to the longitudinal axis and has approximately the same center-to-center distance as the outer edge of the flange 12. The plates 21 are connected to the shank 4 and flange 12 by means of predetermined breaking points 23, and can easily be separated from the fastener 20 either before or after welding of the fastener. The axial length of the outside edge 22 of the plates 21 is sufficiently large here that the fastener 20, when in a cylindrical tube, pipe, or channel with only a slightly larger inside diameter, cannot rotate about an axis perpendicular to the longitudinal axis, and that guidance without jamming is ensured.

Figure 6:
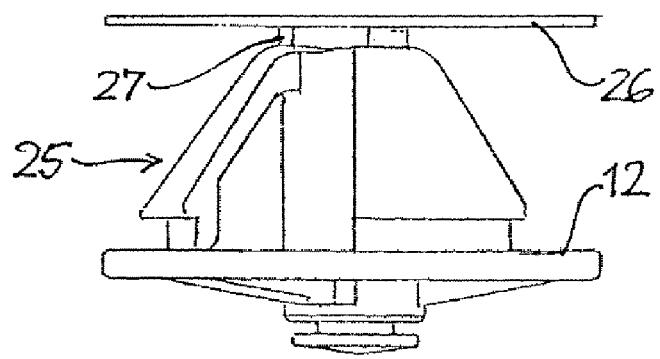
FIG. 6 a fastener with a guide disk.

Shown in FIG. 6 is a fastener 25 that has, on its end opposite the flange 12, a guide disk 26. The guide disk 26 is oriented parallel to the flange 12 and has the same diameter as the flange. In this way, the flange 12 and the guide disk 26 constitute two guides arranged at a distance from one another, thus ensuring jam-free sliding in a cylindrical tube or pipe. The guide disk 26 is detachably connected to the fastener 25 by predetermined breaking points 27, and can easily be broken off before placement in the welding tongs.

Figure 7:
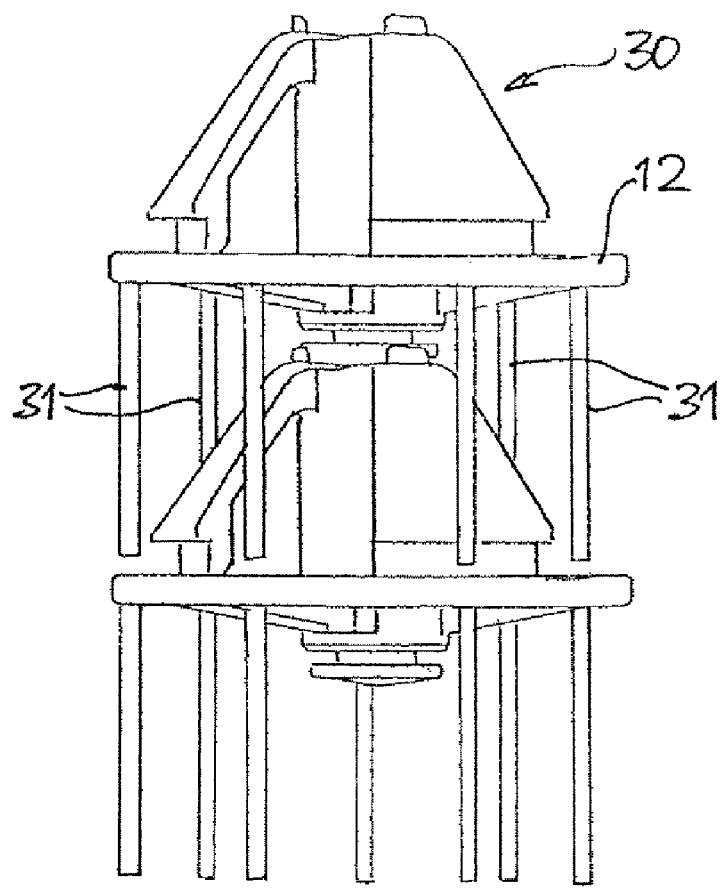
FIG. 7 an arrangement of two fasteners equipped with guide rods.

FIG. 7 shows an embodiment of a fastener 30 in which the flange 12 has, on its outer edge of the side facing from the head, multiple axially parallel rods 31, which serve as guide elements The rods 31 are connected to the flange 12 by predetermined breaking points, and thus can easily be detached. With the aid of the rods 31, the fastener 30 can be conveyed singly in a positionally stable manner through a tube or a pipe with a cylindrical cross-section. Moreover, the rods 31 have an arrangement and length such that multiple fasteners 31 can be arranged one behind the other in a row, as shown in FIG. 7.

Figure 8:
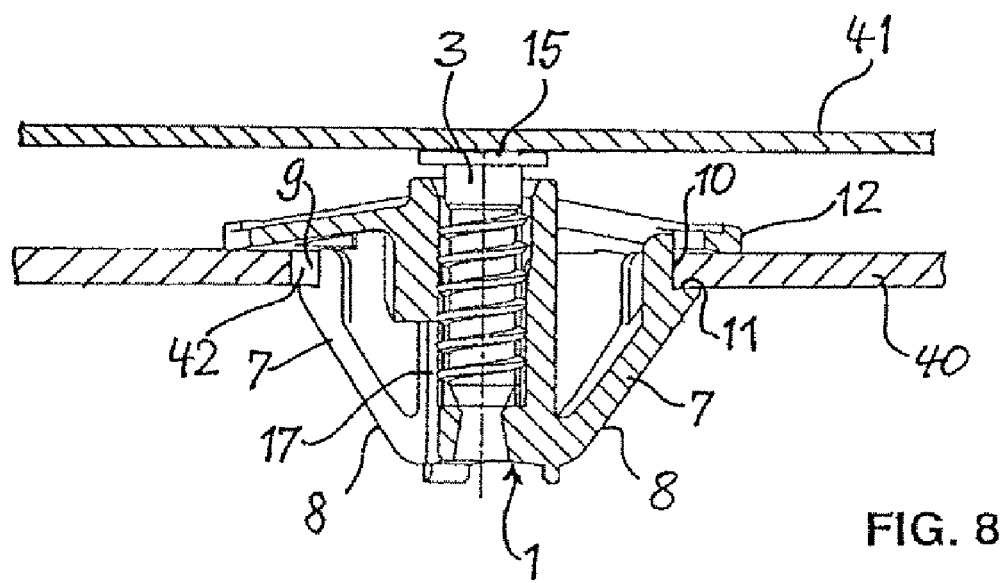
FIG. 8 a cross-section through an assembly using a fastener as shown in FIG. 1.

FIG. 8 shows the fastening of a trim panel 40 to a base 41, for example the floor pan of a motor vehicle. The fastening is accomplished in two steps. First, the fastener 1 is welded by the head 15 of the stud 3 to the base 41 by means of an electric welding device. During the welding process, the stud 3 is held by welding tongs comprised of three fingers, wherein the fingers extend into the gaps between the detent pawls 7 and directly contact and hold the stud 3 through the openings 17. In this way, multiple fasteners 1 required for fastening the trim panel 40 are first welded to the base 41.

Then in the second step, installation of the trim panel 40 on the fasteners 1 takes place. For this purpose the trim panel 40 has, at the points where the fasteners are located on the base 41, round holes 42 whose diameter is the same as, or slightly smaller than, the diameter of the cylindrical surface common to the support surfaces 10. On account of the truncated cone shape of the outside surfaces 8 of the fasteners 1, the trim panel 40 can easily be aligned on the fasteners 1 and pushed onto them. Axial pressure on the trim panel 40 causes it to slide upward with the edges of the holes 42 on the outside surfaces 8 of the detent pawls 7, during which process each of the detent pawls 7 elastically deflects radially inward toward the shank 4. The trim panel 40 is then moved at the individual fastening points until it makes contact with the flange 12, and moves toward the base 41 with slight elastic deformation of said flange until the outside surfaces 8 emerge from the hole 42 and the detent pawls 7 spring back to the locking position shown in the drawing. In this position, the trim panel 40 engages in the engagement recesses 9, and is held without play by the support surfaces 10, 11 and the flange 12. As demonstrated by the explanation, installation of the trim panel 40 is very easy, since the panel need only be brought into the installation position and then pressed on.

If the trim panel is made of a material that is insufficiently stable to be reliably supported on the support surfaces 11, a metal or plastic washer can be installed either during or after installation of the trim panel; this washer bears against the support surfaces 11 and constitutes an adequately large bearing surface for the trim panel. If the trim panel is made of a soft or textile material, the washer can have, on its side facing the panel, spikes, napping, or Velcro-like hooks which anchor in the trim panel and prevent the trim panel from coming loose.

The fastener 51 shown in FIGS. 9 through 13 is intended for fastening delicate trim parts, such as thin-walled shield plates, and is meant to prevent such trim parts from being deformed or damaged during installation. The fastener 51 has the same fundamental structure as the fastener 1 described above, and has a clip 52 made of a thermoplastic material and a stud 53 that can be welded to a base. The clip 52 has a central shank 54 with a longitudinal hole 55 that accommodates the stud 53. Molded onto one end of the shank 54 are four detent pawls 57, which are arranged at regular intervals from one another and extend radially outward from the shank 54 and toward the other end of the shank 54. In the circumferential direction, the individual detent pawls 57 extend over an angle of approximately 50°, with a corresponding circumferential spacing of approximately 40°. The detent pawls 57 have outside surfaces 58, which are part of a truncated cone surface that is coaxial to the longitudinal axis of the shank 54. In this particular exemplary embodiment, the truncated cone surface has a cone angle of 40°. Provided between the detent pawls 57 and the shank 54 is a gap 59, into which the detent pawls 57 that are elastically resilient in the radial direction can deflect during installation of a trim part. Each of the detent pawls 57 is subdivided into three fingers 61 by slots 60, which extend in the longitudinal direction and are open at the free ends of the detent pawls 57. This subdivision lends the detent pawls 57 a significantly greater radial flexibility than the detent pawls 7 of the fastener 1. Consequently, these detent pawls give more easily when the clip 52 is inserted in the hole of a trim part, so that the trim part is not stressed as heavily and hence cannot be bent or damaged as easily.

On the outer side of their free ends, the fingers 61 have engagement recesses 62, which have a support surface 63 extending in the longitudinal direction and a support surface 64 extending in the radial direction. The support surfaces 64 are oriented perpendicular to the longitudinal axis of the fingers 61, but they could also lie in a common plane perpendicular to the longitudinal axis of the shank 54.

Adjacent to the free ends of the detent pawls 57 is a flange 65, which is molded onto the open end of the shank 54. The flange 65 has the shape of a flat truncated cone. Its outer edge has a larger diameter than the free ends of the detent pawls 57, and is provided with a ring-shaped reinforcement 66 to create a bearing surface for the trim part to be fastened. Beneath the detent pawls 57, the flange 65 has recesses, which are at least as large as the axial projection of the detent pawls 57. In this way, the clip 52 can be produced by injection molding using a simple two-part mold. Since the recesses 67 weaken the attachment of the flange 65 to the shank 54, reinforcing ribs 68 are centered in each of the gaps between the detent pawls; these reinforcing ribs project from the shank 54 in the radial direction and join the shank 54 to the flange 65. The shank 54 also has radial openings 69 on two diametrically opposing sides, which allow the stud 53 to be connected to contact elements for supplying the welding current.

FIG. 10 illustrates an application of the fastener 51 in automotive manufacture. Here, the fastener 51 is connected to a shield plate 70, which has very thin walls and can be bent easily. The shield plate 70 is attached to the clip 52. To this end, it has a circular opening whose diameter corresponds to the outer diameter of the clip 52 at the axial support surfaces 63 of the engagement recesses 62. For installation, the shield plate 70 is placed on the end of the clip 52 shaped like a truncated cone, and is pressed over the detent pawls 57 into the final position shown in FIG. 10. During this process, because of their resilience the fingers 61 of the detent pawls 57 deflect radially inward without a great deal of resistance, and then spring back to their original position once the final installation position is reached. As a result, the shield plate 70 can be installed without great stress and without the risk of deformation. In the final installation position, the radial support surfaces 64 of the fingers 61 grip the edge of the opening in the shield plate 70 and hold it securely on the clip 52. After installation of the shield plate 70, a trim part can be installed on the clip 52 in the same manner as described above in connection with FIG. 8, with the trim part resting directly on the shield plate 70. During installation of the trim part, the flange 65 deforms elastically toward the base that is welded to the stud 53 under the influence of the installation pressure, thus producing the gap between the shield plate 70 and the support surfaces 64 that is needed to accommodate the trim part. As a result, after installation the edge of the trim part's opening rests against the support surfaces 64, and the shield plate 70 is located between the flange 65 and the trim.

Exemplary embodiments of the present invention have been described for illustrative purposes, and those skilled in the art will appreciate that various modifications, additions and substitutions are possible, without departing from the scope and spirit of the invention as disclosed in the accompanying claims.

What is claimed is:

1. A fastener comprising:
a shank for attaching a covering part to a structural workpiece, said shank having a first end and a second end,
a head at the first end of the shank, said head being adapted for attachment to the workpiece,
a plurality of detent pawls formed on the shank at the second end of the shank, the detent pawls extending radially outward from the shank and also extending axially from the second end toward the head at the first end of the shank, and
wherein the detent pawls are elastically resilient and are adapted to be compressed about the axis of the shank in the radially inward direction until the diameter of the compressed pawls is smaller than the diameter of a mounting hole in the covering part, the pawls having on the outside an engagement recess with a radial and an axial support surface for engaging the covering part,
wherein the shank has a longitudinal hole configured to receive a stud and,
wherein one end of the stud projects out of the longitudinal hole and forms the head, and
wherein a flange that is elastically resilient in the longitudinal direction of the shank is formed on the shank, the flange having an edge region located opposite the engagement recess of the detent pawl.

2. The fastener according to claim 1, wherein the plurality of detent pawls comprise multiple detent pawls which are separated from one another by gaps,
wherein outside surfaces of the detent pawls constitute segments of a common truncated cone surface; and
wherein the radial support surfaces of the detent pawl engagement recesses lie on a common cylindrical surface that is coaxial to the truncated cone surface.

3. The fastener according to claim 2, wherein the shank includes an opening that is freely accessible from outside in the radial direction, and that opens onto the longitudinal hole.

4. The fastener according to claim 2, wherein a reinforcing rib is located in a gap between two detent pawls and projects from the shank and joins the shank to the flange.

5. The fastener according to claim 2, wherein the longitudinal hole in the shank is configured to receive an external thread of a stud in an interlocking manner.

6. The fastener according to claim 2, wherein an end of the shank has a tool engagement region.

7. The fastener according to claim 1, wherein the flange is recessed in an area of the axial projection of the detent pawls.

8. The fastener according to claim 1, wherein the detent pawls are subdivided into fingers by at least one slot extending in the longitudinal direction.

9. The fastener according to claim 1, further comprising a guide disk which is spaced apart from the flange and is parallel to the flange.

10. The fastener according to claim 1, wherein coupling elements are arranged at the end of the shank opposite the head.

11. A fastener comprising:
a shank,
a head at one end of the shank,
at least one detent pawl formed on the shank, the detent pawl extending radially outward from the shank toward the head, and
wherein the at least one detent pawl is elastically resilient in the radially inward direction and has on its outside an engagement recess with a radial and an axial support surface,
wherein the shank has a longitudinal hole configured to receive a stud, wherein one end of the stud projects out of the longitudinal hole and forms the head, and
wherein a flange that is elastically resilient in the longitudinal direction of the shank is formed on the shank, the flange having an edge region located opposite the engagement recess of the detent pawl,
the fastener further comprising guide elements provided on at least one of the shank and the detent pawl;
wherein the guide elements axially lengthen the outside contour of the flange, and wherein the guide elements are connected in a separable manner to the fastener by means of predetermined breaking points.

12. The fastener according to claim 11, wherein the guide elements consist of axially parallel rods arranged on a circumferential edge of the flange.

13. A fastener for attaching a covering part to a structural workpiece comprising:
   a clip comprising a shank with a longitudinal hole, a flange extending from a first end of the shank and at least one detent pawl extending from a second end of the shank; and
   a stud comprising a head and a shaft, the shaft of the stud being engaged in the shank of the clip and the head being adapted for attachment to the structural workpiece;
   wherein the detent pawls extend radially outward from the shank and also extend axially from the second end of the shank toward the head, and
   wherein the at least one detent pawls are elastically resilient and can compress radially around the shank when axial pressure is applied to the pawls until the diameter of the compressed pawls is less than that of a mounting hole in the covering part, and
   wherein the pawls have an engagement recess at a distal end, the engagement recess comprising a radial support surface and an axial support surface.

14. The fastener according to claim 13, wherein the at least one detent pawl comprises a plurality of detent pawls which are separated from one another by gaps,
   wherein outside surfaces of the detent pawls constitute segments of a common truncated cone surface; and
   wherein the radial support surfaces of the detent pawl engagement recesses lie on a common cylindrical surface that is coaxial to the truncated cone surface.

15. The fastener according to claim 14, wherein the fastener further comprises a plurality of axial parallel guide rods extending from the flange in an axial direction away from the second end of the shank.

16. The fastener according to claim 14, wherein a reinforcing rib is located in a gap between two detent pawls and projects from the shank and joins the shank to the flange.

17. The fastener according to claim 13, wherein the shaft of the stud is threaded and the threads engage an inner surface of the shank to connect the stud and the clip.

18. The fastener according to claim 17, wherein the fastener further comprises a guide disk at the second end of the shank, the guide disk being in a plane perpendicular to a longitudinal direction of the shank.

19. The fastener according to claim 13, wherein the at least one detent pawl is subdivided into fingers by at least one slot extending in the longitudinal direction.

* * * * *